United States Patent
Frenzel et al.

(10) Patent No.: US 9,487,156 B2
(45) Date of Patent: Nov. 8, 2016

(54) HOLDING FRAME FOR SENSOR DEVICES IN VEHICLES

(71) Applicant: Continental Automotive GmbH, Hannover (DE)

(72) Inventors: Henryk Frenzel, Regensburg (DE); Vinzenz Jeremias Sauerer, Wenzenbach (DE); Thomas Augustin, Nuremberg (DE)

(73) Assignee: Continental Automotive GmbH, Hannover (DE)

( * ) Notice: Subject to any disclaimer, the term of this patent is extended or adjusted under 35 U.S.C. 154(b) by 162 days.

(21) Appl. No.: 14/381,677

(22) PCT Filed: Feb. 8, 2013

(86) PCT No.: PCT/DE2013/100045
§ 371 (c)(1),
(2) Date: Aug. 28, 2014

(87) PCT Pub. No.: WO2013/127388
PCT Pub. Date: Sep. 6, 2013

(65) Prior Publication Data
US 2015/0041510 A1    Feb. 12, 2015

(30) Foreign Application Priority Data

Mar. 2, 2012  (DE) .......... 10 2012 101 781

(51) Int. Cl.
*B60R 11/00* (2006.01)
*B60R 11/04* (2006.01)
*B60R 11/02* (2006.01)

(52) U.S. Cl.
CPC ............... *B60R 11/02* (2013.01); *B60R 11/04* (2013.01); *B60R 2011/005* (2013.01); *B60R 2011/0026* (2013.01)

(58) Field of Classification Search
CPC ............... B60R 11/04; B60R 2011/0026
USPC ............... 224/482, 42.4, 547, 545, 902
See application file for complete search history.

(56) References Cited

U.S. PATENT DOCUMENTS

| 2,427,335 A | * | 9/1947 | Antonia | ............... | A47J 47/16 220/478 |
| 3,035,806 A | * | 5/1962 | Hamer | ............... | B64D 45/00 248/503 |

(Continued)

FOREIGN PATENT DOCUMENTS

| DE | 195 38 249 | 6/1996 |
| DE | 202008003168 | 6/2008 |

(Continued)

OTHER PUBLICATIONS

International Search Report of the International Searching Authority for International Application PCT/DE2013/100045, mailed May 2, 2013, 2 pages, European Patent Office, HV Rijswijk, Netherlands.

(Continued)

*Primary Examiner* — Justin Larson
(74) *Attorney, Agent, or Firm* — W. F. Fasse

(57) ABSTRACT

A holding frame is to be arranged behind a vehicle window, and is to receive and hold a sensor device. The holding frame has guideways to receive and guide holding elements of the sensor device, and devices to produce a force on the sensor device substantially in a direction along the guideways. The combination of the holding frame and the sensor device forms a sensor arrangement.

17 Claims, 12 Drawing Sheets

(56) References Cited

U.S. PATENT DOCUMENTS

| | | | | | |
|---|---|---|---|---|---|
| 3,165,163 | A | * | 1/1965 | Holka | H01M 2/1083 180/68.5 |
| 3,651,883 | A | * | 3/1972 | Aldag | H01M 2/1083 180/68.5 |
| 4,930,694 | A | * | 6/1990 | Yoshitake | B60P 7/13 224/547 |
| 5,398,157 | A | * | 3/1995 | Paul | G06F 1/184 248/221.11 |
| 5,484,667 | A | * | 1/1996 | Sahli | H01M 2/1083 180/68.5 |
| 5,562,322 | A | * | 10/1996 | Christoffel | B60N 2/01583 248/503.1 |
| 5,730,414 | A | * | 3/1998 | Wenger | B62D 25/2072 224/42.32 |
| 5,950,973 | A | * | 9/1999 | Verma | B60R 11/00 248/221.11 |
| 6,230,834 | B1 | * | 5/2001 | Van Hout | B60R 16/04 180/68.5 |
| 6,666,362 | B1 | * | 12/2003 | LeTrudet | B60R 7/02 224/42.4 |
| 7,344,116 | B2 | * | 3/2008 | Ficarra | B63C 11/02 211/107 |
| 7,726,427 | B2 | * | 6/2010 | Picavet | H01M 2/1083 180/68.5 |
| 7,806,308 | B2 | * | 10/2010 | Gunn | B60R 9/06 224/512 |
| 7,881,047 | B2 | * | 2/2011 | Hatanaka | B60R 11/0235 174/261 |
| 8,176,603 | B2 | * | 5/2012 | Carnevali | B60R 11/0241 24/522 |
| 8,223,203 | B2 | * | 7/2012 | Ohsumi | B60R 11/04 348/122 |
| 8,348,112 | B2 | * | 1/2013 | Becker | H01Q 1/1221 224/547 |
| 8,381,955 | B2 | * | 2/2013 | Grater | B60K 13/02 224/545 |
| 8,413,947 | B2 | * | 4/2013 | Chiang | B62M 6/90 180/207.3 |
| 8,456,311 | B2 | * | 6/2013 | Wohlfahrt | B60S 1/0822 248/309.1 |
| 8,754,774 | B2 | * | 6/2014 | Wohlfahrt | B60S 1/0822 248/309.1 |
| 8,944,705 | B1 | * | 2/2015 | Matori | G03B 17/561 396/419 |
| 9,016,148 | B2 | * | 4/2015 | Niemann | B60R 11/00 248/503 |
| 9,032,593 | B2 | * | 5/2015 | Rayos | F16B 17/00 224/321 |
| 9,193,308 | B2 | * | 11/2015 | Okuda | B60R 11/04 |
| 2007/0164188 | A1 | * | 7/2007 | Mordau | B60S 1/0822 248/503 |
| 2009/0279236 | A1 | * | 11/2009 | Hatanaka | B60R 11/0235 361/679.01 |
| 2012/0099850 | A1 | * | 4/2012 | Onishi | B60R 11/04 396/419 |
| 2012/0104195 | A1 | * | 5/2012 | Da Costa Pito | B60R 11/0241 248/205.1 |
| 2012/0207461 | A1 | * | 8/2012 | Okuda | B60R 11/04 396/419 |
| 2015/0041510 | A1 | * | 2/2015 | Frenzel | B60R 11/04 224/482 |
| 2015/0124150 | A1 | * | 5/2015 | Hibino | B60R 11/04 348/335 |
| 2016/0009230 | A1 | * | 1/2016 | Miyado | B60R 11/04 224/482 |
| 2016/0023620 | A1 | * | 1/2016 | Matori | B60R 11/04 348/148 |

FOREIGN PATENT DOCUMENTS

| | | |
|---|---|---|
| DE | 102010010571 | 9/2011 |
| WO | WO 97/17230 | 5/1997 |

OTHER PUBLICATIONS

PCT International Preliminary Report on Patentability including English Translation of PCT Written Opinion of the International Searching Authority for International Application PCT/DE2013/100045, issued Sep. 2, 2014, 6 pages, International Bureau of WIPO, Geneva, Switzerland.

Office Action in German Patent Application No. 10 2012 101 781.6, mailed Oct. 10, 2013, 5 pages, with partial English translation, 2 pages.

Chinese Office Action in Chinese Patent Application No. 201380007404.7, mailed Nov. 24, 2015, 7 pages, with English translation, 7 pages.

* cited by examiner

HOLDING FRAME FOR SENSOR DEVICES IN VEHICLES

FIELD OF THE INVENTION

The invention relates to a holding frame for arrangement inside a vehicle, on a vehicle window, and for the arrangement of at least one sensor device in the holding frame. The invention further relates to a sensor arrangement which is arranged inside a vehicle, behind a vehicle window, and comprises a holding frame according to the invention.

BACKGROUND INFORMATION

In modern vehicles, sensor devices are increasingly being used, for example for driver assistance systems. These sensor devices are often arranged behind the windscreen of a vehicle by means of a fastening device and look through the screen in the direction of travel. Examples of sensor devices are radar, ultrasonic, laser and LiDAR sensors as well as vehicle cameras of varying design, e.g. for distance measurement and/or for detecting objects, obstacles and roadway barriers.

A fastening device for the arrangement of a vehicle camera behind a windscreen is, for example, known from DE 10 2010 010 571 A1.

The fastening devices used for the sensor device so far have several drawbacks.

It is often difficult to install and remove sensor devices in/from known fastening devices, and usually large forces are required, in particular if elastic components, e.g. metal or plastic springs, are used to compensate for installation or positional tolerances. Such elastic components act contrary to their normal function in most cases, i.e. opposite to the fastening or installation direction of the sensor device, in particular if the elastic components push the sensor device away from the vehicle window.

In particular in case of fastening devices which combine a snap-lock or snap-in action with elastic fixing elements, in particular elastic components made of plastic, e.g. plastic springs, negative effects will be observed as a function of temperature and over time, e.g. the elastic components may creep and/or yield. As a result, the sensor device will, in particular, come loose within the fastening device during its service life in the vehicle.

SUMMARY OF THE INVENTION

In view of the above, an object of at least one embodiment of the invention is to provide a solution for fastening a sensor device behind a vehicle window in a simple, cost-efficient and long-term stable manner.

This object can be achieved by respectively at least one inventive embodiment of a device or a holding frame or a sensor arrangement having the features set forth herein. In further embodiments of the invention, further developments and combinations of individual features with each other are also possible.

It is an underlying idea of at least one embodiment of the invention that a fastening device which serves to arrange a sensor device behind a vehicle window should be designed in the form of a holding frame. The holding frame comprises guideways formed on a side or at an end of the frame. These guideways are preferably designed, e.g. configured and arranged, such that a sensor device comprising holding elements, which preferably match, i.e. are suitable for being guided in or along, the guideways, can be moved toward, e.g. closer to, the vehicle window along a path defined by the specific configuration and arrangement of the guideways. Suitable devices, which are preferably formed on an opposite side or at an opposite end of the frame and/or on a corresponding side of the sensor device, may produce a suitable mechanical force in the guiding direction of the guideways, which causes the sensor device or the holding elements of the sensor device to be guided in or along the guideways when the sensor device is arranged or placed in the holding frame. The sensor device is preferably fixed in the holding frame by means of additional elastic or resilient fixing devices. In this regard, it is a significant advantage of the invention that only a small force is required to fix the sensor device in the holding frame, or the sensor device can be fixed by elastic or resilient components with almost no force. As only small forces are required, disadvantages, such as creeping, yielding and/or loosening as a function of temperature and over time, can be avoided.

The holding frame according to an embodiment of the invention may be arranged inside a vehicle, in particular on a vehicle window, and preferably serves to arrange or receive at least one sensor device whose direction of view is, in particular, through the holding frame and through the vehicle window. The holding frame may also be part of a fastening device which consists of further components, in particular for further in-vehicle devices, such as rear-view mirrors or display instruments. This means the holding frame may also be part of a larger fastening device for several electronic components, in particular for various sensor devices. Such fastening devices are also called brackets. In general, the holding frame according to the invention may have any basic shape. An embodiment with a polygonal, in particular square or rectangular, basic shape comprising at least four linear frame sides is particularly suitable. The holding frame may be arranged directly on the vehicle window, e.g. of an adhesive connection. In particular, the design in the form of a frame enables the sensor device to be arranged with its direction of view through the holding frame and through the vehicle window. The vehicle window is preferably the windscreen or the rear window of the vehicle, so that the sensor device arranged in the holding frame may, for example, serve to scan a surrounding area ahead of or behind the vehicle, in particular the road environment. The sensor device which may be arranged in the holding frame according to the invention is preferably a vehicle camera. It is also possible to arrange several and/or other sensor devices in the holding frame, for example ultrasonic, radar or LiDAR sensors and/or e.g. a rain sensor for detecting rain on the surface of the vehicle window.

According to an embodiment of the invention, the holding frame is designed with guideways in the area of at least one side or at least at one end, preferably at a front end. The guideways serve to receive holding elements which are preferably formed on a corresponding side or at a corresponding end of the sensor device which may be arranged in the holding frame. The guideways are preferably designed, e.g. configured and arranged such that, when the sensor device is arranged or placed in the holding frame, the holding elements of the sensor device are guided in or along the guideways in such a manner that the sensor device is moved toward, e.g. closer to, the vehicle window.

In the area of at least one side opposite the guideways or at the end opposite the guideways, the holding frame according to an embodiment of the invention further comprises suitable force devices for producing a mechanical force, in particular a resilience or elasticity, which acts substantially in the guiding direction of the guideways when the sensor device is arranged in the holding frame, so that the force devices cause or force the holding elements of the sensor device to be guided in the guideways when the sensor device is arranged in the holding frame. The devices are preferably formed at a rear end of the holding frame.

In this regard, "substantially in the guiding direction" means, in particular, that the effective direction of the force produced by the devices differs by less than 90° from the guiding direction of the guideways or the average guiding direction of the guideways, preferably in such a way that the force produced by the devices causes the holding elements of the sensor device to be guided in the guideways. "Guiding direction" means, in particular, the direction in which the holding elements of the sensor device are guided in the guideways, or in which the sensor device is moved towards the vehicle window when it is arranged in the holding frame.

In a preferred embodiment of the holding frame according to the invention, the devices for producing the mechanical force are designed in the form of rigid and/or flexible (or elastic) guide ramps. The guide ramps are preferably designed with inclined planes where a sensor device which is arranged in the holding frame is guided in such a manner that the sensor device is forced to move in the guiding direction of the guideways and the holding elements of the sensor device are forced to be guided within the guideways.

In an advantageous embodiment of the holding frame according to the invention, the holding frame is formed with additional devices for mechanically fixing the sensor device in the holding frame. The additional devices may, for example, be spring elements which fix the sensor device in the holding frame, in particular when it reaches a final position, for example by means of a snap-lock or snap-in action. The purpose of fixing the sensor device by means of the additional devices is to secure it against falling out of the holding frame, in particular to secure the position of the sensor device in the direction perpendicular to the guiding direction of the guideways. As the sensor device is secured, in particular, perpendicular to the guiding direction, almost no force or only small forces is/are required.

In a particular embodiment of the holding frame according to the invention, the guideways are designed with a substantially S-shaped profile. It is a significant advantage of such a design that a sensor device which is arranged in a holding frame according to the invention can be moved toward the vehicle window along a defined S-shaped curved path.

In a preferred embodiment of the holding frame according to the invention, the guideways are aligned substantially parallel to the vehicle window in the area of a final position of the holding elements or in a final position of the sensor device in the holding frame.

The sensor arrangement according to an embodiment of the invention is preferably arranged inside a vehicle, behind a vehicle window, in particular behind the windscreen, and comprises a holding frame formed according to any one of the embodiments described above. The sensor arrangement according to the invention further comprises at least one sensor device arranged in the holding frame. The sensor device is preferably designed with holding elements on a side which corresponds, in particular, to the side or the end of the holding frame where the guideways are formed, and the holding elements serve to guide the sensor device in guideways of the holding frame when the sensor device is arranged in the holding frame and to fix the sensor device in the holding frame when it reaches a desired final position.

In a preferred embodiment of the sensor arrangement according to the invention, a side of the sensor device which corresponds to or faces the side or end of the holding frame opposite the guideways is designed with force devices which serve to produce a mechanical force substantially acting on the sensor device in the guiding direction of the guideways, in particular when the sensor device is arranged or placed in the holding frame. The force devices may further be designed to fix the sensor device, for example by a snap-lock action, when the sensor device reaches a final position in the holding frame.

In a particular embodiment of the sensor arrangement according to the invention, the sensor device is a vehicle camera whose direction of view or scanning direction is, in particular, through the holding frame.

In an advantageous embodiment of the sensor arrangement, the holding elements formed on the sensor device are cylindrical bolts. The cylindrical bolts may each be designed with at least one deformation rib, in particular to compensate for tolerances when the sensor device is guided in the guideways of the holding frame. The deformation ribs are preferably formed on the holding elements in such a manner that they face the vehicle window when the holding elements are arranged or guided in the guideways, for example to keep the sensor device at a constant distance from the windowpane. The holding elements need not be cylindrical but may have another shape although the holding elements preferably have a shape matching the size and design of the guideways of the holding frame.

BRIEF DESCRIPTION OF THE DRAWINGS

Further advantages and optional designs of the holding frame according to the invention and of the sensor arrangement according to the invention are set out in the description below and shown in the drawings. Exemplary embodiments are shown in the drawings in a simplified manner and explained in detail in the description below.

In the figures.

DETAILED DESCRIPTION OF EXAMPLE EMBODIMENTS OF THE INVENTION

Figure 1:
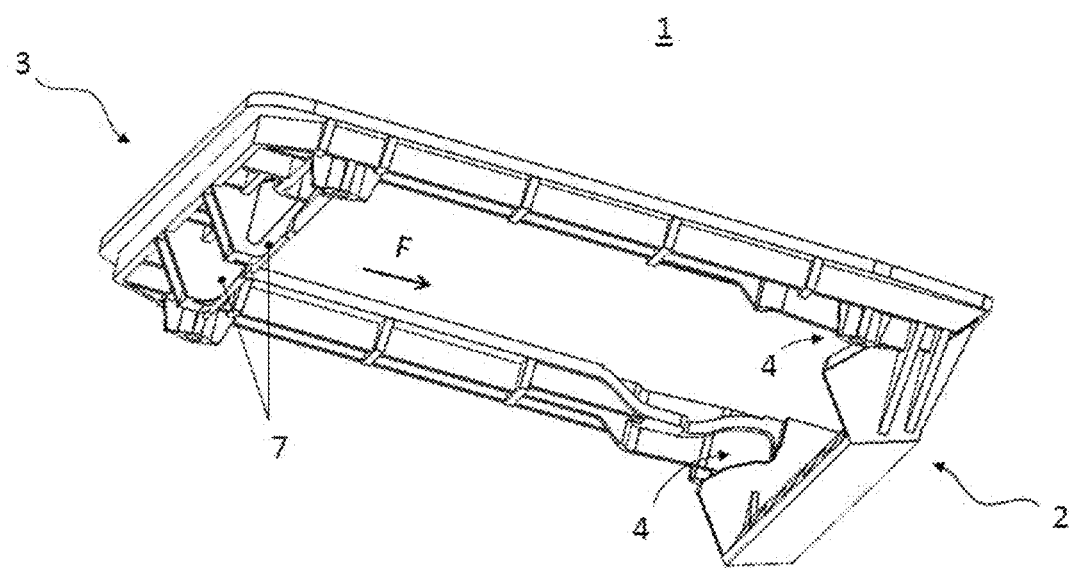
FIG. 1 shows a first example of a holding frame according to the invention.

FIG. 1 shows an example of a holding frame 1 according to the invention. The holding frame 1 has a generally rectangular shape whose four sides form a frame profile, wherein each two opposite frame sides are parallel to each other. Two guideways 4 are designed at a front end or on a front side 2 of the holding frame 1, which is opposite a rear side 3 or a rear end. The guideways 4 serve to receive holding elements 10 arranged on a sensor device 8 which can be arranged in the holding frame 1 according to the invention. On the side 3 of the holding frame, which is opposite the guideways 4, devices are formed which produce a force F acting on a sensor device 8, in particular when the sensor device 8 is arranged in the holding frame 1, and which causes holding elements 10, which may be formed on the sensor device 8 according to the invention, to be guided in the guideways 4. These devices are guide ramps 7 in the present case.

Figure 2A:
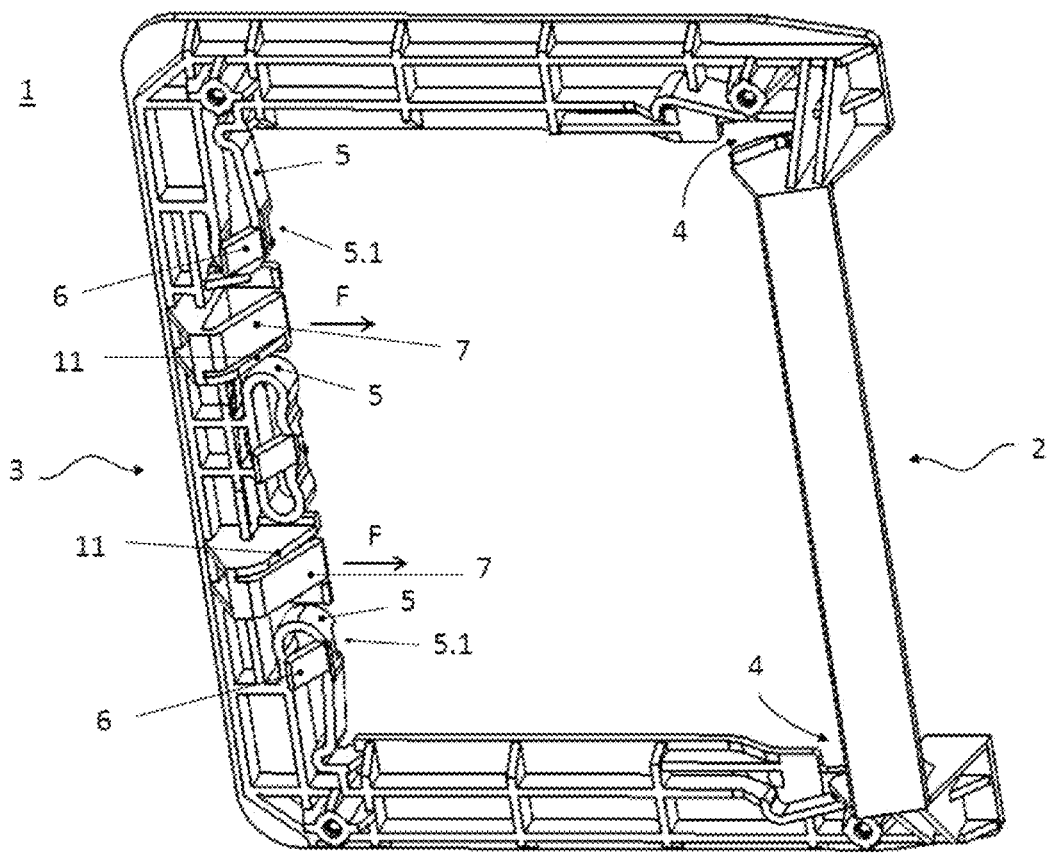
FIGS. 2a and 2b show a second example of a holding frame according to the invention.
Figure 2B:
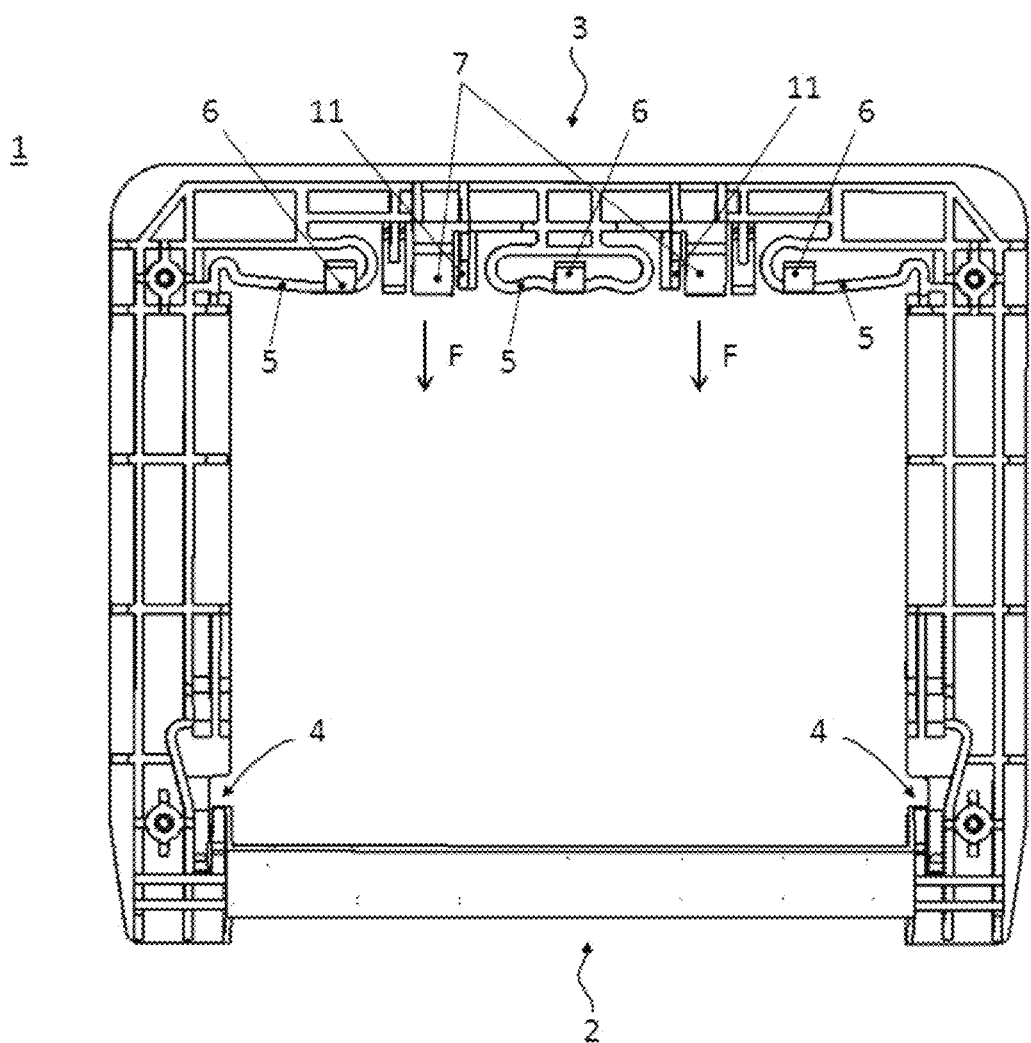

FIGS. 2*a* and 2*b* show another example of a holding frame 1 according to the invention, each of them from another perspective. The holding frame 1 comprises guideways 4 formed on a front side 2 of the holding frame 1. The holding frame 1 further comprises devices formed on the side 3 opposite the guideways 4 or the rear side 3 of the holding frame 1.

These devices are spring elements 5 on the one hand, which are designed such that they can fix a sensor device 8 in the holding frame 1 or secure the position of the sensor device, in particular at right angles to the guiding direction of the guideways 4, by means of a snap-lock action. To this end, the spring elements 5 are, in part, formed with recesses 5.1, which can be engaged by matching elements 17, e.g. flat springs, which may be formed on the sensor device 8. The spring elements 5 are, in addition, designed with snap-lock release elements 6 which enable the sensor device 8, or the fixing mechanism which locks the sensor device 8 in the holding frame 1 by means of the spring elements 5, to be released manually. Further devices are inclined guideways 7 and rigid guide elements 11, which are arranged on the side 3 of the holding frame 1 opposite the guideways 4 and exert a force F on the sensor device 8 in the guiding direction of the guideways 4 when the sensor device is arranged in the holding frame, thus causing the sensor device 8 or the holding elements 10 thereof to be guided in the guideways 4. The rigid guide elements 11 serve, in particular, to guide or center a sensor device 8 from the side when it is arranged in the holding frame 1.

Figure 3:
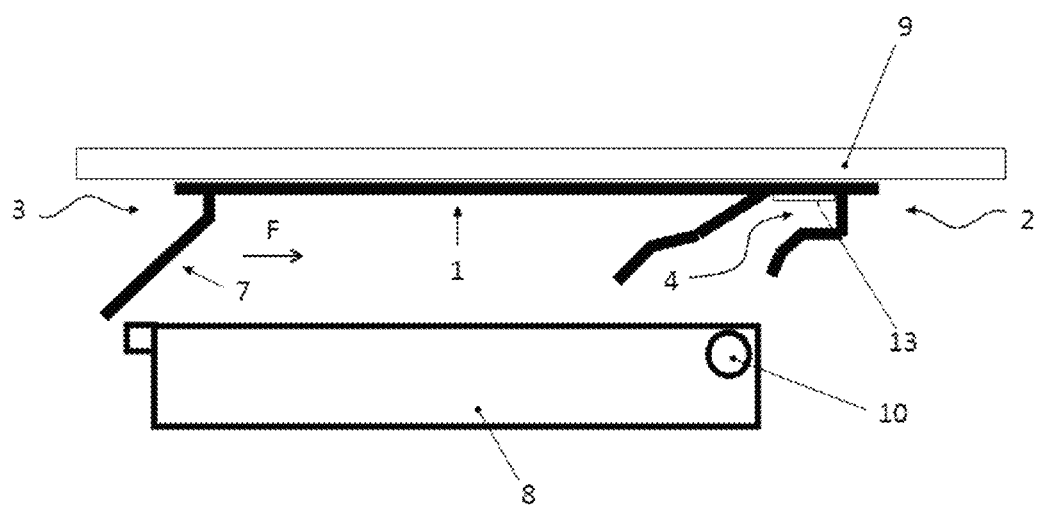
FIG. 3 illustrates the functional principle of the holding frame according to the invention.
Figure 4A:
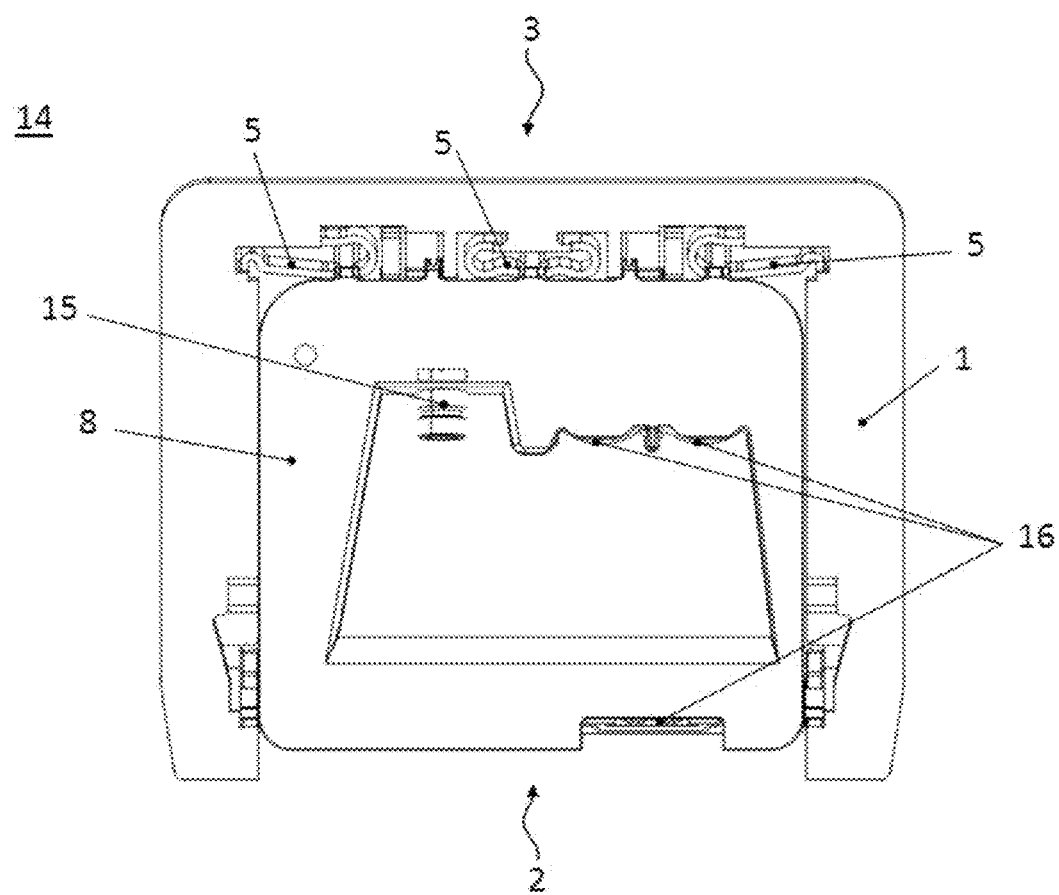
FIGS. 4a to 4d show an example of a sensor arrangement according to the invention.
Figure 4B:
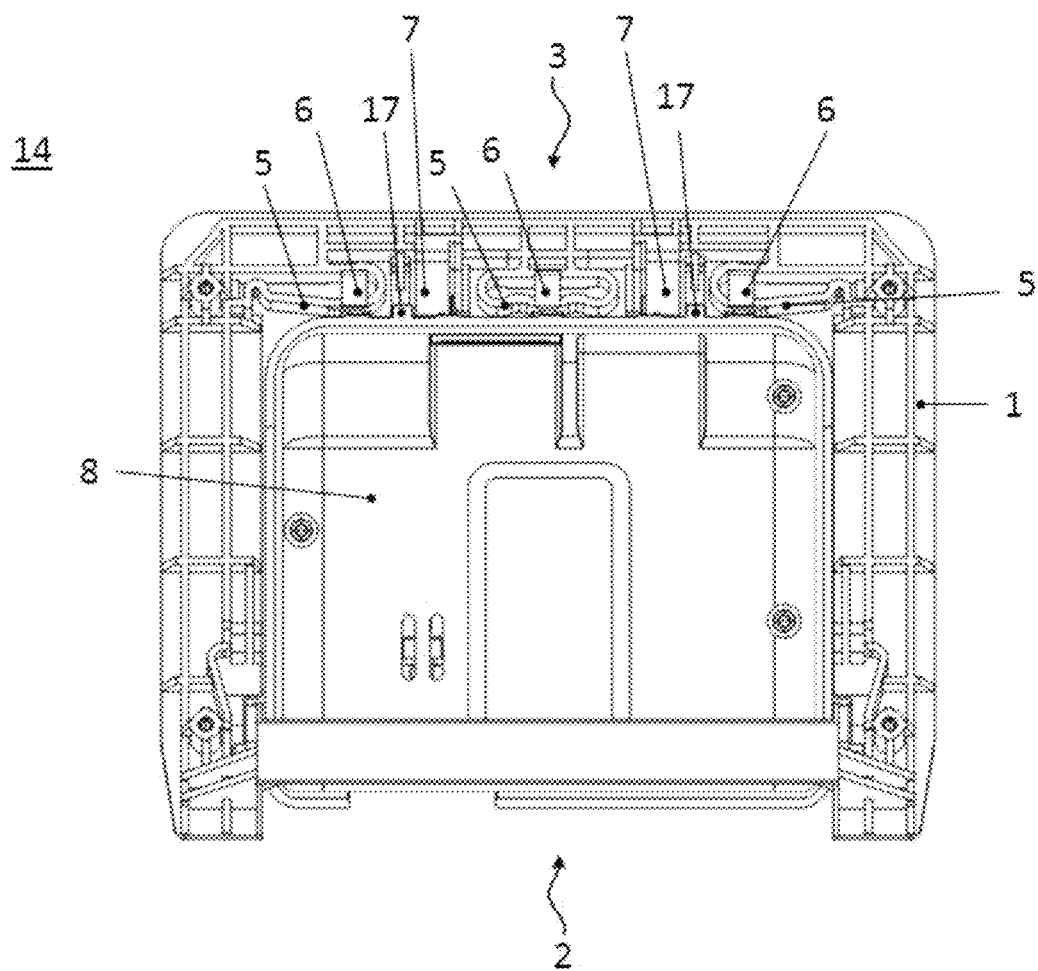
Figure 4C:
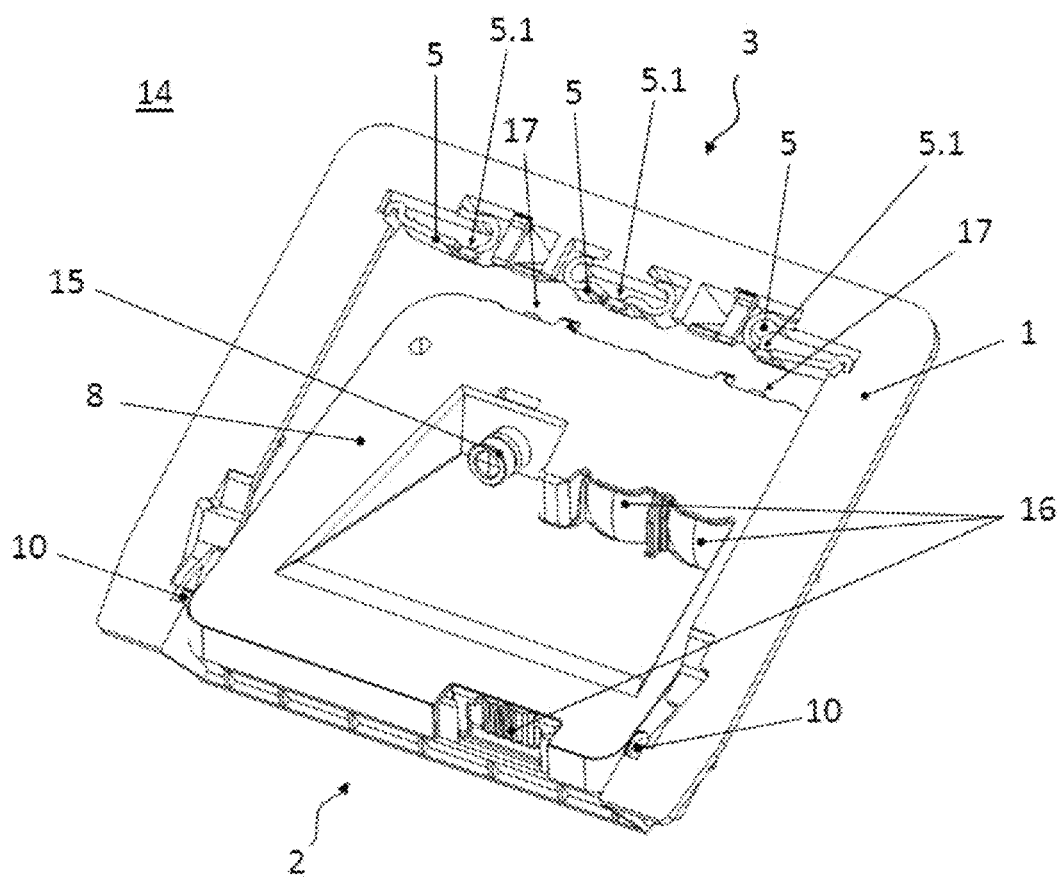
Figure 4D:
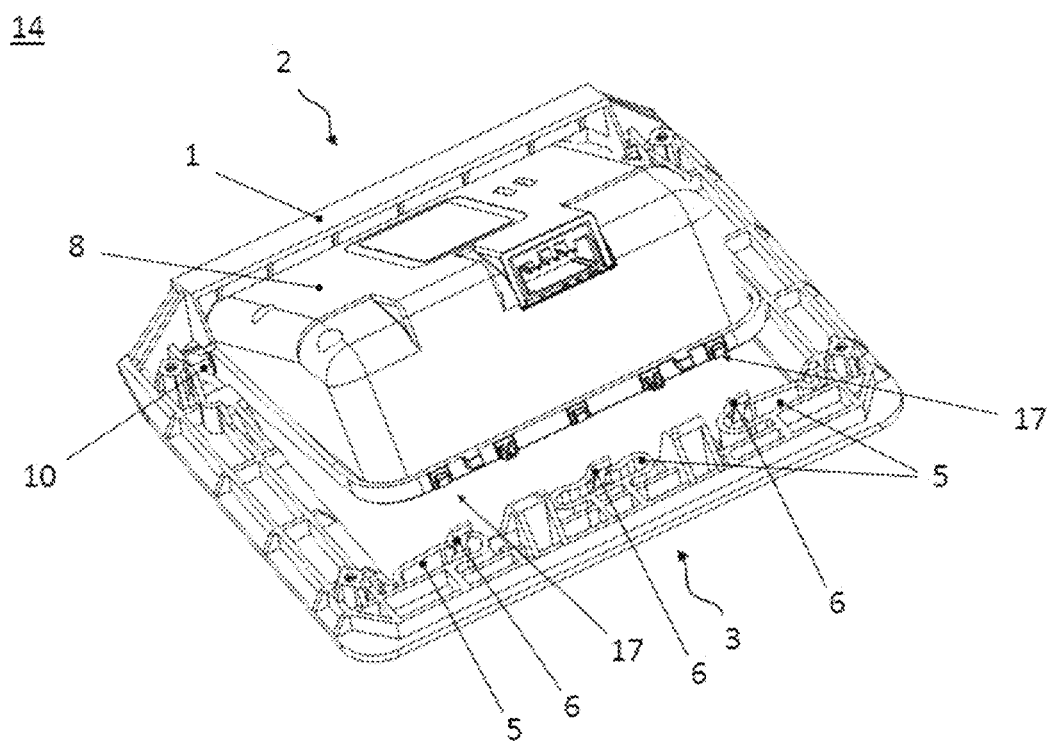

FIG. 3 illustrates the principle of the holding frame 1 according to the invention, in particular the functional principle when a sensor device 8 is arranged in the holding frame 1. According to FIG. 3, the holding frame 1 is arranged on a vehicle window 9, for example on the windscreen of a vehicle. According to the invention, guideways 4 are designed on the front side 2 of the holding frame 1. On the side 3 of the holding frame 1 opposite the guideways 4, devices 7 are designed which produce a force F for guiding holding elements 10 of the sensor device 8 in the guideways 4, in particular when the sensor device 8 is arranged in the holding frame. When a sensor device 8 is arranged, the devices 7 cause the holding elements 10 to be guided in the guideways 4 in such a manner that the sensor device 8 is moved towards the vehicle window 9 along the guiding direction of the guideways 4. In the example of FIG. 3, the guideways 4 are designed with an S-shaped profile, and aligned parallel to the vehicle window 9 in an area 13 corresponding to a final position of the sensor device 8 or of the holding elements 10 thereof. The holding elements 10 formed on the sensor device 8 are shown as cylindrical bolts in this case. The parallel design of the guideways 4 in the final position 13 and the cylindrical design of the holding elements 10 of the sensor device 8 make it particularly easy to fix the sensor device 8 in the holding element with virtually no force. The devices 7 which are formed on the side 3 of the holding frame 1 opposite the guideways 4 only need to produce a small force F in order to guide the holding elements 10 in the guideways 4. Moreover, additional devices 5 which comprise a snap-lock or snap-in mechanism and are located on the side 3 of the holding frame 1 opposite the guideways 4 serve to position the sensor device 8 in a long-term stable manner and, advantageously, with substantially no force since, preferably, the sensor device 8 needs only to be secured against falling out of the holding frame 1. This prevents disadvantageous effects, such as creeping, in the securing or fixing mechanism of the sensor device, so that the sensor device will not come loose over time.

FIGS. 4*a* to *d* show an example of a sensor arrangement 14 according to the invention, each from another perspective. The sensor arrangement 14 may, for example, be arranged inside a vehicle, behind a vehicle window 9, and comprises a holding frame 1 and a sensor device 8. The sensor device 8 is a combination of a vehicle camera 15 and a LiDAR sensor 16 (Light Detection And Ranging) in this case. The sensor device comprises holding elements 10 which are arranged in guideways 4 of the holding frame 1. The holding frame 1 is the holding frame 1 according to the invention of FIGS. 2*a* and 2*b* in this case. The guideways 4 of the holding frame 1 are designed such that the sensor device 8 is moved towards the vehicle window 9 along a defined path by means of the holding elements 10 in the guideways 4 when it is arranged in the holding frame 1. In the shown exemplary embodiment, the sensor arrangement 14 is designed with a snap-lock mechanism on the side 3 opposite the guideways 4, in this case with stops 17 on the sensor device 8 and recesses 5.1 on the spring elements 5 of the holding frame 1, which engage one another or snap into one another when the holding elements 10 reach a final position in the guideways 4, in particular when the rear part of the sensor device 8 is pressed into the holding frame 1.

Figure 5A:
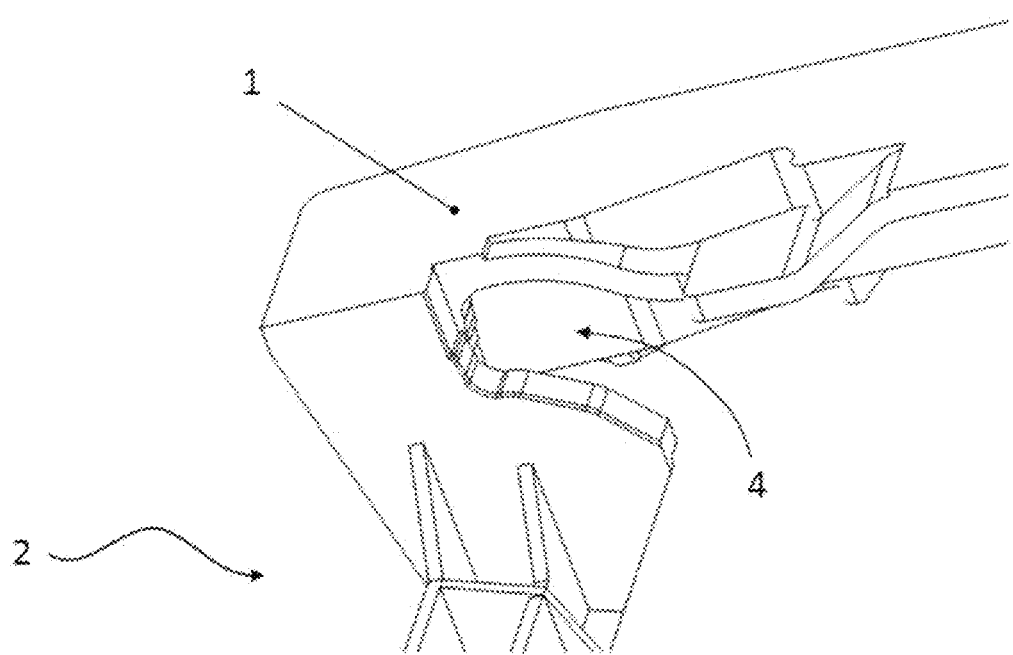
FIGS. 5a to 5d show detailed views of a holding frame according to the invention and of a sensor arrangement according to the invention.
Figure 5B:
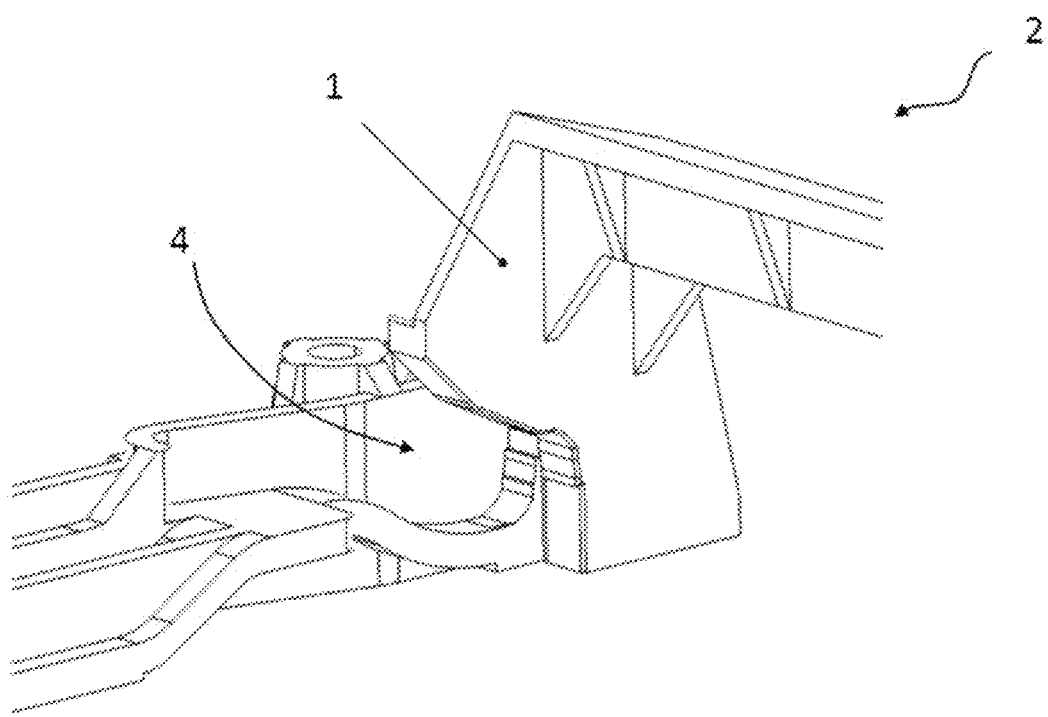
Figure 5C:
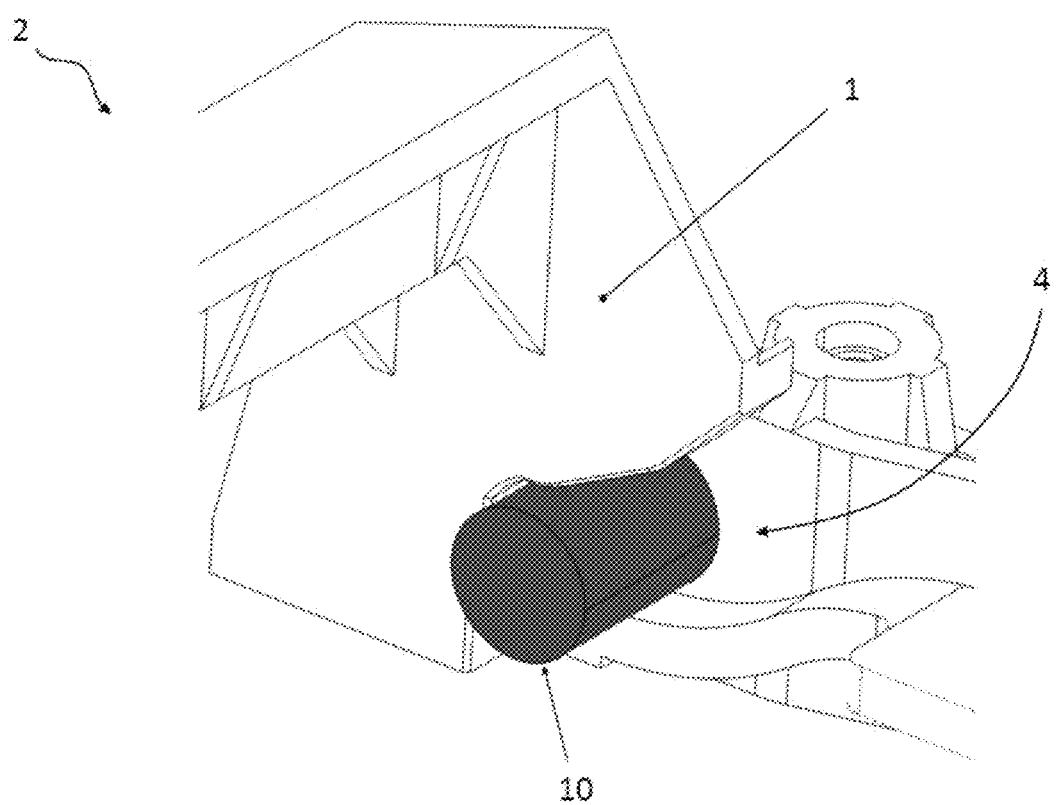
Figure 5D:
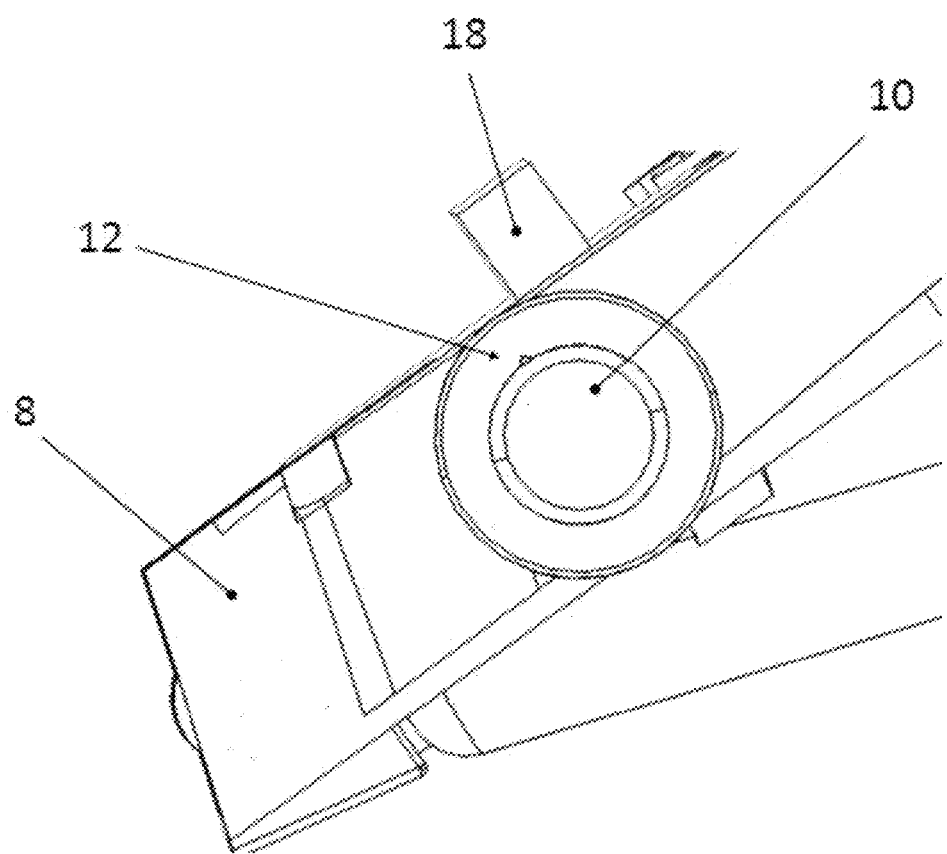

FIGS. 5*a* to 5*d* show detailed views of various elements of the holding frame 1 according to the invention and of the sensor arrangement 14 according to the invention. FIGS. 5*a* and 5*b* are each detailed views of the front area 2 of the holding frame 1 according to the invention and show a preferred design of the guideways 4. FIG. 5*c* shows a holding element 10 of a sensor device 8 in a guideway 4 of a holding frame 1 according to the invention. FIG. 5*d* shows a detailed view of a front area of a sensor device 8 and a holding element 10 which is formed on the sensor device 8. The holding element 10 is designed with a deformation rib 12 in this case. The deformation rib 12 serves to compensate for tolerances and is arranged on the upper side of the holding element 10, i.e. on the side facing the vehicle window 9 when the sensor device is arranged in the holding frame 1, so that the deformation rib 12 pushes the holding element 10 downwards (or away from the windowpane 9) when the sensor device 8 is arranged in the holding frame 1, thus keeping the sensor device 8 at a constant distance from the windowpane 9. On the side facing the vehicle window 9, an elastic element 18 is arranged on the sensor device 8 of FIG. 5*d*. The elastic element 18, which may, for example, be foam rubber, is located directly between the windowpane 9 and the sensor device 8 when the sensor device 8 is arranged in the holding frame 1 and may serve to prevent noise, for example due to vibration, and/or to separate the light beams transmitted by the LiDAR sensor 16 from the received light beams.

LIST OF REFERENCE NUMERALS

1 Holding frame
2 Front side or front end of the holding frame (side with guideways)
3 Rear side or rear end of the holding frame (side opposite the guideways)
4 Guideways
5 Flat springs
5.1 Recesses
6 Snap-lock release elements
7 Guide ramps 8 Sensor device
9 Vehicle window
10 Holding elements
11 Rigid guide elements for centering from the side
12 Deformation rib
13 Area of a final position
14 Sensor arrangement
15 Vehicle camera
16 LiDAR sensor
17 Stops for snap-lock mechanism
18 Elastic element
F Force, substantially in the guiding direction of the guideways

The invention claimed is:

1. A holding frame to be arranged inside a vehicle behind a vehicle window, wherein the holding frame is configured and adapted to receive at least one sensor device in the holding frame, and the holding frame comprises:
   guideways provided on a first side of the holding frame, wherein the guideways have a substantially S-shaped profile and are configured and arranged to receive holding elements of the sensor device such that the holding elements are guided along the guideways so as to move the sensor device toward the vehicle window when the sensor device is placed in the holding frame, and
   force devices provided on a second side of the holding frame opposite the first side, wherein the force devices are configured and arranged to produce a mechanical force acting on the sensor device substantially in a guiding direction of the guideways so as to cause the holding elements to move along the guideways when the sensor device is placed in the holding frame.

2. The holding frame according to claim 1, wherein the force devices comprise rigid guide ramps.

3. The holding frame according to claim 1, wherein the force devices comprise flexible guide ramps.

4. The holding frame according to claim 1, further comprising at least one fixing device configured and arranged to mechanically fix the sensor device in the holding frame.

5. The holding frame according to claim 4, wherein the at least one fixing device comprises at least one flat spring with a snap-lock mechanism configured and arranged to mechanically fix the sensor device in the holding frame.

6. The holding frame according to claim 1, wherein the guideways include guideway portions that are aligned substantially parallel to the vehicle window in an area of a final position of the holding elements.

7. A sensor arrangement to be arranged inside a vehicle behind a vehicle window, wherein:
   the sensor arrangement comprises a holding frame and a sensor device,
   the sensor device is configured to be arranged in the holding frame, and includes holding elements proximate a first end of the sensor device,
   the holding frame includes guideways proximate a first side of the holding frame,
   the guideways are configured and arranged to receive and guide the holding elements to be guided along the guideways such that the sensor device is moved toward the vehicle window when the sensor device is placed in the holding frame, and
   proximate a second end of the sensor device opposite the first end thereof, the sensor device further includes first force devices configured and arranged to produce a mechanical force acting substantially in a guiding direction of the guideways so as to cause the holding elements to move along the guideways when the sensor device is placed in the holding frame.

8. The sensor arrangement according to claim 7, wherein the holding frame, proximate a second side thereof opposite the first side, further includes second force devices that are configured and arranged to participate with the first force devices in producing the mechanical force acting substantially in the guiding direction of the guideways so as to cause the holding elements to move along the guideways when the sensor device is placed in the holding frame.

9. The sensor arrangement according to claim 8, wherein the second force devices comprise rigid guide ramps.

10. The sensor arrangement according to claim 8, wherein the second force devices comprise flexible guide ramps.

11. The sensor arrangement according to claim 7, wherein the holding frame further includes at least one fixing device configured and arranged to mechanically fix the sensor device in the holding frame.

12. The sensor arrangement according to claim 11, wherein the at least one fixing device comprises at least one flat spring with a snap-lock mechanism configured and arranged to mechanically fix the sensor device in the holding frame.

13. The sensor arrangement according to claim 7, wherein the guideways include guideway portions that are aligned substantially parallel to the vehicle window in an area of a final position of the holding elements.

14. The sensor arrangement according to claim 7, wherein the guideways have a substantially S-shaped profile.

15. The sensor arrangement according to claim 7, wherein the sensor device comprises a vehicle camera with a direction of view oriented through the holding frame.

16. The sensor arrangement according to claim 7, wherein each one of the holding elements respectively comprises a cylindrical bolt with deformation ribs.

17. A sensor arrangement to be arranged inside a vehicle behind a vehicle window, and that comprises a holding frame and a sensor device,
   wherein the sensor device is configured to be arranged in the holding frame and includes holding elements proximate a first end of the sensor device,
   wherein the holding frame comprises guideways on a first side of the holding frame, and the guideways are configured to receive the holding elements of the sensor device such that, when the sensor device is placed in the holding frame, the holding elements are guided along the guideways so that the sensor device is moved toward the vehicle window,
   wherein the holding frame further comprises first devices on a second side of the holding frame opposite the first side thereof, and the sensor device further comprises second devices proximate a second end of the sensor device opposite the first end thereof, and
   wherein the first and second devices are configured and adapted to produce a mechanical force acting on the sensor device substantially in a guiding direction of the guideways when the sensor device is placed in the holding frame, so that the mechanical force causes the holding elements to be moved along the guideways when the sensor device is placed in the holding frame.

* * * * *